United States Patent
Huang et al.

(10) Patent No.: US 10,116,400 B2
(45) Date of Patent: Oct. 30, 2018

(54) OPTICAL SIGNAL FREQUENCY CALIBRATION METHOD AND DEVICE

(71) Applicant: Huawei Technologies Co., Ltd., Shenzhen (CN)

(72) Inventors: Yuanda Huang, Shenzhen (CN); Liangchuan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/709,056

(22) Filed: Sep. 19, 2017

(65) Prior Publication Data

US 2018/0006740 A1 Jan. 4, 2018

Related U.S. Application Data

(63) Continuation of application No. PCT/CN2015/074600, filed on Mar. 19, 2015.

(51) Int. Cl.
*H04B 10/572* (2013.01)
*H04B 17/21* (2015.01)
*H04B 10/079* (2013.01)
*H04B 10/61* (2013.01)
*H04B 17/11* (2015.01)
(Continued)

(52) U.S. Cl.
CPC ......... *H04B 17/21* (2015.01); *H04B 10/0795* (2013.01); *H04B 10/503* (2013.01); *H04B 10/61* (2013.01); *H04B 17/11* (2015.01); *H04J 14/02* (2013.01)

(58) Field of Classification Search
CPC ............................ H04J 14/0249; H04B 10/572
See application file for complete search history.

(56) References Cited

U.S. PATENT DOCUMENTS

| 5,396,361 A * | 3/1995 | Sasaki | H01S 5/4025 |
| | | | 398/1 |
| 2008/0050115 A1* | 2/2008 | Ikai | H04J 14/02 |
| | | | 398/31 |
| 2013/0058651 A1* | 3/2013 | Treyer | H04B 10/60 |
| | | | 398/58 |

FOREIGN PATENT DOCUMENTS

| CN | 101867418 A | 10/2010 |
| CN | 102215079 A | 10/2011 |
| CN | 102264012 A | 11/2011 |

(Continued)

OTHER PUBLICATIONS

Cheng et al., "Automatic ONU Wavelength Control in TWDM PONs", OFC 2014.*

(Continued)

*Primary Examiner* — Shi K Li
(74) *Attorney, Agent, or Firm* — Leydig, Voit & Mayer, Ltd.

(57) ABSTRACT

The present invention discloses an optical signal frequency calibration method and device. The method includes: receiving a first optical signal that experiences a frequency offset and that is generated by a laser in a transmitter of an access node; receiving a reference optical signal sent by a local oscillator; calculating a difference between a specified frequency difference and a frequency difference between the reference optical signal and the first optical signal; and performing frequency calibration on the first optical signal according to the difference, modulating to-be-sent uplink data by using the calibrated first optical signal, and sending the modulated uplink data to a primary node.

20 Claims, 5 Drawing Sheets

(51) Int. Cl.
*H04B 10/50* (2013.01)
*H04J 14/02* (2006.01)

(56) References Cited

FOREIGN PATENT DOCUMENTS

| | | |
|---|---|---|
| CN | 102820932 A | 12/2012 |
| CN | 104038302 A | 9/2014 |
| EP | 2362558 A1 | 8/2011 |

OTHER PUBLICATIONS

Tabares et al., "Automatic λ- Control With Offset Compensation in DFB Intradyne Receiver for udWDM-PON," IEEE Photonics Technology Letters, vol. 27, No. 4, pp. 443-446, Institute of Electrical and Electronics Engineers, New York, New York (Feb. 15, 2015).

\* cited by examiner

OPTICAL SIGNAL FREQUENCY CALIBRATION METHOD AND DEVICE

CROSS-REFERENCE TO RELATED APPLICATIONS

This application is a continuation of International Application No. PCT/CN2015/074600, filed on Mar. 19, 2015, the disclosure of which is hereby incorporated by reference in its entirety.

TECHNICAL FIELD

The present invention relates to the field of optical communications technologies, and in particular, to an optical signal frequency calibration method and device.

BACKGROUND

With rapid development of Internet services and multimedia services, higher requirements are imposed on a capacity and usage of an optical communications network. Featuring high frequency band usage and flexibility, an ultra dense wavelength-division multiplexing (UDWDM) technology with a frequency separation less than 10 GHz has a great use value in a transmission network in the future.

A UDWDM convergence networking mode meets a high-capacity transmission requirement in the future and allows access by means of direct coupling, and does not require convergence and filtering for multiple times, so that operation device costs can be reduced, and operation efficiency can be improved.

Specifically, an optical communications network obtained in the UDWDM convergence networking mode includes one primary node and at least one access node. In an uplink, access nodes separately use different UDWDM frequency bands, uplink signals of the access nodes are combined by using a coupler in a communications link, and a combined uplink signal is sent to the primary node. In a downlink, the primary node sends a downlink signal to nodes in a broadcast mode. In the downlink, for the downlink signal broadcast by the primary node, a frequency division multiplexing manner may be used, so that the access nodes receive the downlink signal in different frequency bands; or a time division multiplexing manner may be used, so that the access nodes receive the downlink signal in different timeslots.

However, in actual application, the access nodes may use different laser light sources, and a center frequency offset of a laser light source may be +/−5 GHz. Therefore, in an uplink process, uplink signals sent by the access nodes cause crosstalk between adjacent channels, and consequently, transmission of the uplink signals is affected.

SUMMARY

In view of this, embodiments of the present invention provide an optical signal frequency calibration method and device, so as to resolve an existing problem of crosstalk between adjacent channels caused in a transmission process of an uplink signal.

According to a first aspect, an optical signal frequency calibration method is provided, including:

receiving a first optical signal that experiences a frequency offset and that is generated by a laser in a transmitter of an access node;

receiving a reference optical signal sent by a local oscillator, where the reference optical signal is obtained after a receiver of the access node performs, by using a received second optical signal sent by a primary node, frequency calibration on a third optical signal generated by the local oscillator;

calculating a difference between a specified frequency difference and a frequency difference between the reference optical signal and the first optical signal; and performing frequency calibration on the first optical signal according to the difference, modulating to-be-sent uplink data by using the calibrated first optical signal, and sending the modulated uplink data to the primary node.

According to a second aspect, an optical signal frequency calibration device is provided, including:

a receiving unit, configured to: receive a first optical signal that experiences a frequency offset and that is generated by a laser in a transmitter of an access node, and receive a reference optical signal sent by a local oscillator, where the reference optical signal is obtained after a receiver of the access node performs, by using a received second optical signal sent by a primary node, frequency calibration on a third optical signal generated by the local oscillator;

a calculation unit, configured to calculate a difference between a specified frequency difference and a frequency difference between the reference optical signal and the first optical signal; and a frequency calibration unit, configured to: perform frequency calibration on the first optical signal according to the difference, modulate to-be-sent uplink data by using the calibrated first optical signal, and send the modulated uplink data to the primary node.

According to a third aspect, an optical signal frequency calibration device is provided, including:

a signal receiver, configured to: receive a first optical signal that experiences a frequency offset and that is generated by a laser in a transmitter of an access node, and receive a reference optical signal sent by a local oscillator, where the reference optical signal is obtained after a receiver of the access node performs, by using a received second optical signal sent by a primary node, frequency calibration on a third optical signal generated by the local oscillator;

a processor, configured to: calculate a difference between a specified frequency difference and a frequency difference between the reference optical signal and the first optical signal, perform frequency calibration on the first optical signal according to the difference, and modulate to-be-sent uplink data by using the calibrated first optical signal; and a signal transmitter, configured to send the modulated uplink data to the primary node.

In the embodiments of the present invention, a first optical signal that experiences a frequency offset and that is generated by a laser in a transmitter of an access node is received; a reference optical signal sent by a local oscillator is received, where the reference optical signal is obtained after a receiver of the access node performs, by using a received second optical signal sent by a primary node, frequency calibration on a third optical signal generated by the local oscillator; a difference between a specified frequency difference and a frequency difference between the reference optical signal and the first optical signal is calculated; and frequency calibration is performed on the first optical signal according to the difference, to-be-sent uplink data is modulated by using the calibrated first optical signal, and the modulated uplink data is sent to the primary node. In this way, in a UDWDM convergence network, each access node uses an optical signal sent by a primary node as a reference, to perform frequency offset calibration on an optical signal that experiences a frequency offset and that is generated by a laser in a transmitter, so that uplink signals transmitted by all access nodes corresponding to the primary node have a same relative offset. Therefore, crosstalk between adjacent channels caused in a transmission process of the uplink signals is effectively avoided, and transmission performance of the uplink signals is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To achieve the objective of the present invention, embodiments of the present invention provide an optical signal frequency calibration method and device. A first optical signal that experiences a frequency offset and that is generated by a laser in a transmitter of an access node is received; a reference optical signal sent by a local oscillator is received, where the reference optical signal is obtained after a receiver of the access node performs, by using a received second optical signal sent by a primary node, frequency calibration on a third optical signal generated by the local oscillator; a difference between a specified frequency difference and a frequency difference between the reference optical signal and the first optical signal is calculated; and frequency calibration is performed on the first optical signal according to the difference, to-be-sent uplink data is modulated by using the calibrated first optical signal, and the modulated uplink data is sent to the primary node. In this way, in a UDWDM convergence network, each access node uses an optical signal sent by a primary node as a reference, to perform frequency offset calibration on an optical signal that experiences a frequency offset and that is generated by a laser in a transmitter, so that uplink signals transmitted by all access nodes corresponding to the primary node have a same relative offset. Therefore, crosstalk between adjacent channels caused in a transmission process of the uplink signals is effectively avoided, and transmission performance of the uplink signals is improved.

The following further describes the embodiments of the present invention in detail with reference to this specification. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
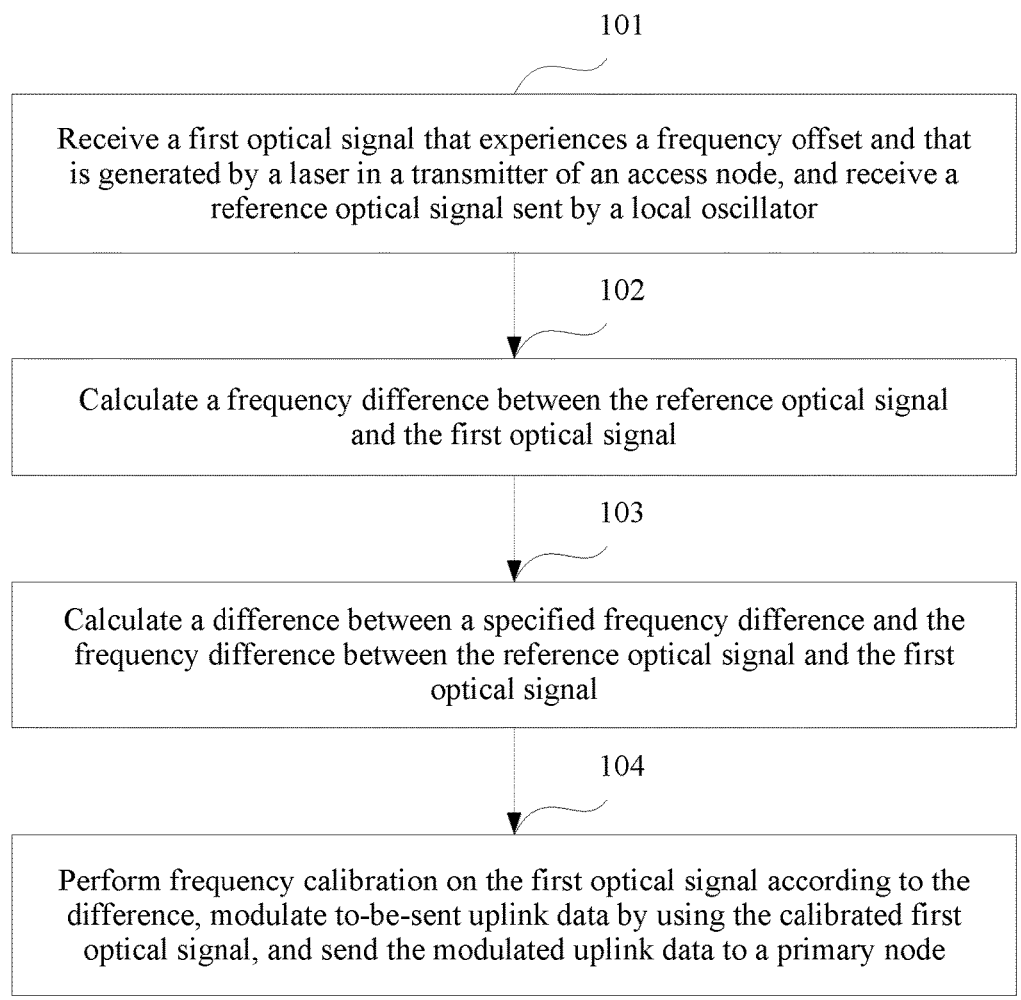
FIG. 1 is a schematic flowchart of an optical signal frequency calibration method according to the present invention.

FIG. 1 is a schematic flowchart of an optical signal frequency calibration method according to the present invention. The method may be described as follows:

Step 101: Receive a first optical signal that experiences a frequency offset and that is generated by a laser in a transmitter of an access node, and receive a reference optical signal sent by a local oscillator.

The reference optical signal is obtained after a receiver of the access node performs, by using a received second optical signal sent by a primary node, frequency calibration on a third optical signal generated by the local oscillator.

In step 101, the receiving a reference optical signal sent by a local oscillator specifically includes:

calculating a frequency difference between the received second optical signal sent by the primary node and the third optical signal generated by the local oscillator; and performing calibration on the third signal by using the frequency difference, where an obtained calibrated optical signal is the reference optical signal.

Specifically, the receiver of the access node receives the second optical signal sent by the primary node and the third optical signal generated by the local oscillator; an ICR (Integrated coherent receiver) performs frequency mixing on the received second optical signal and third optical signal; an optical-to-electrical conversion module converts an optical signal obtained after the frequency mixing into an electrical signal; and then an analog-to-digital conversion module (ADC) converts the electrical signal into a digital signal.

A digital signal processing module determines a frequency difference between a center frequency of the second optical signal and a center frequency of the third optical signal by detecting the digital signal, and sends the determined frequency difference to the local oscillator. The local oscillator performs frequency calibration on the third optical signal according to the frequency difference obtained by means of calculation, to obtain a calibrated reference optical signal.

In this way, the local oscillator implements calibration for the third optical signal according to the frequency difference.

It should be noted herein that the frequency difference herein is a frequency difference of the center frequency of the third optical signal relative to the center frequency of the second optical signal, that is, herein the frequency difference between the center frequency of the third optical signal and the center frequency of the second optical signal is calculated by using the center frequency of the second optical signal as a reference.

Step 102: Calculate a frequency difference between the reference optical signal and the first optical signal.

In step 102, a manner of calculating the frequency difference between the reference optical signal and the first optical signal includes but is not limited to the following several manners:

Method 1:

Step 1: Perform coupling and direct-current filtering processing on the reference optical signal and the first optical signal, to obtain a single-frequency signal.

Specifically, after coupling and beat frequency processing is performed on the reference optical signal and the first optical signal, a direct-current signal is obtained. A frequency of the direct-current signal is an ideal frequency difference between the reference optical signal and the first optical signal. Filtering processing is performed on the direct-current signal by using a DC block (DC Block), to obtain the single-frequency signal. A frequency of the single-frequency signal is the frequency of the direct-current signal.

Step 2: Determine the frequency difference between the reference optical signal and the first optical signal by using the single-frequency signal and a specified reference clock.

Manner 1: Determine a frequency of the specified reference clock, where the reference clock may be generated by an independent crystal oscillator, or may be generated by a DSP of the receiver, and this is not limited herein;

perform frequency conversion processing on the single-frequency signal according to the frequency of the reference clock, so that a frequency of the single-frequency signal obtained after the frequency conversion processing is the same as the frequency of the reference clock; and calculate a phase difference between the single-frequency signal obtained after the frequency conversion processing and a signal of the clock, and obtain the frequency difference between the reference optical signal and the first optical signal according to the phase difference.

Specifically, a phase detector detects the phase difference between the single-frequency signal obtained after the frequency conversion processing and the signal of the clock, and obtains the frequency difference between the reference optical signal and the first optical signal by using a loop filter.

It should be noted herein that frequency conversion, phase detection, and loop filtering may further be completed by the DSP.

Figure 2:
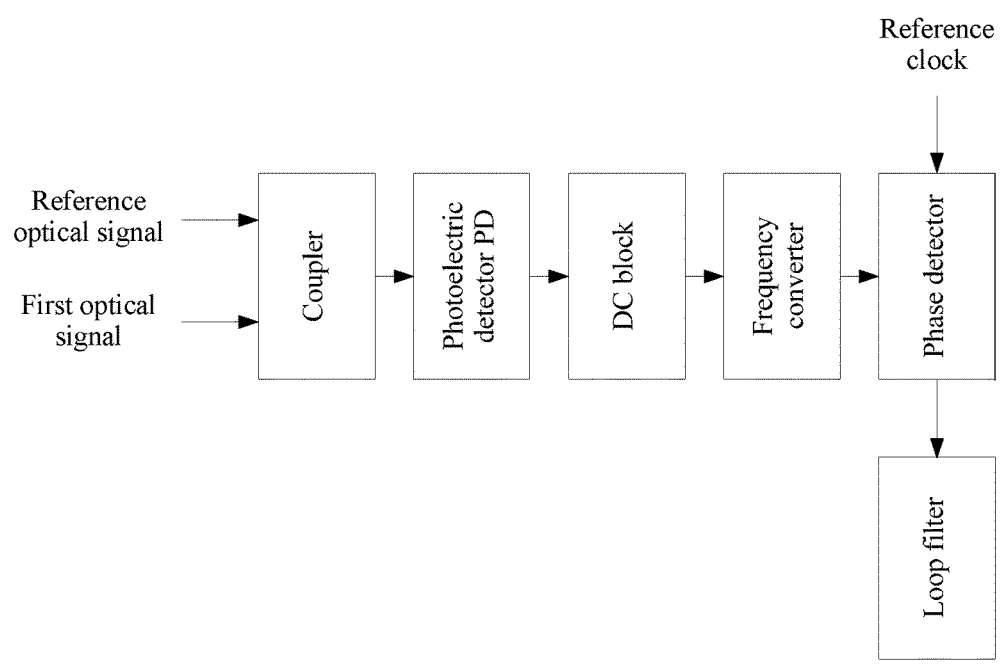
FIG. 2 is a schematic structural diagram in which a frequency difference between a reference optical signal and a first optical signal is calculated.

As shown in FIG. 2, FIG. 2 is a schematic structural diagram in which the frequency difference between the reference optical signal and the first optical signal is calculated.

Manner 2: Determine a frequency of the single-frequency signal;

perform frequency conversion processing on the reference clock according to the frequency of the single-frequency signal, so that a frequency of the reference clock obtained after the frequency conversion processing is the same as the frequency of the single-frequency signal; and calculate a phase difference between the frequency of the reference clock obtained after the frequency conversion processing and the single-frequency signal, and obtain the frequency difference between the reference optical signal and the first optical signal according to the phase difference.

Figure 3:
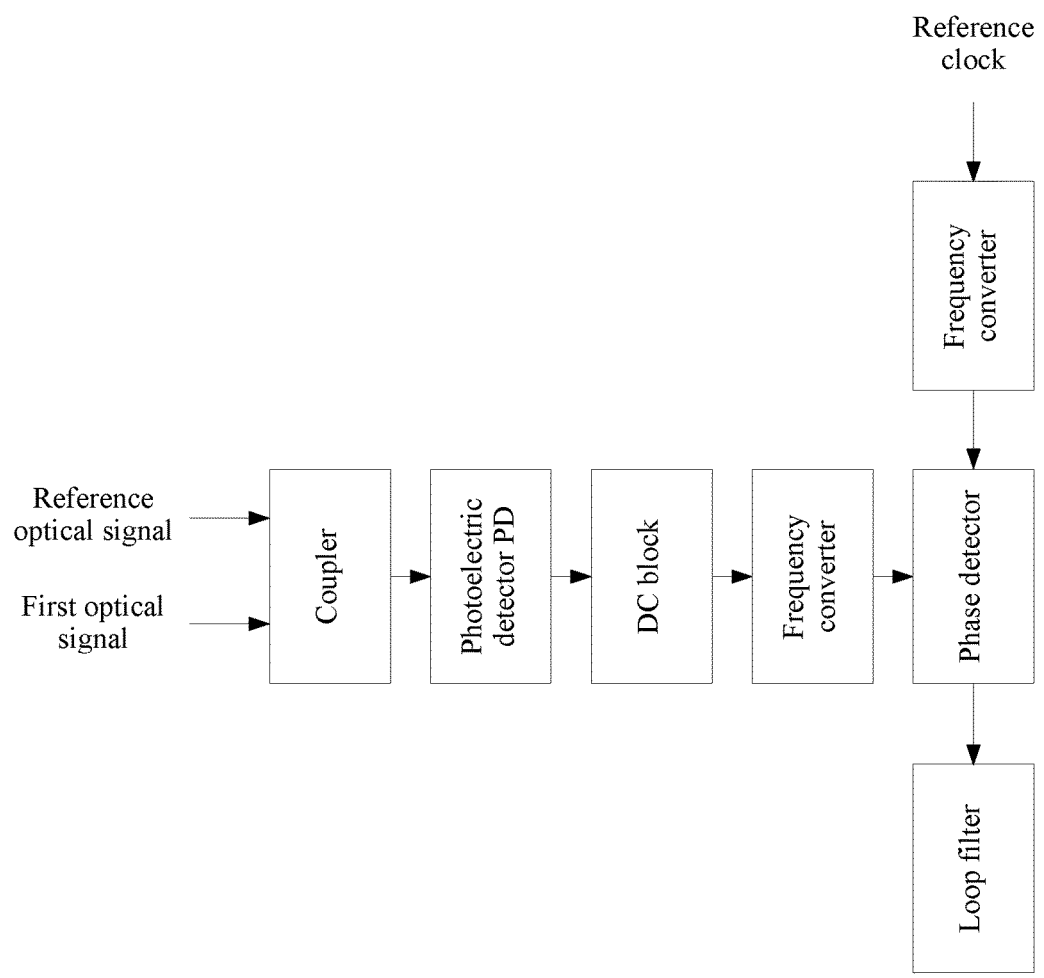
FIG. 3 is a schematic structural diagram in which a frequency difference between a reference optical signal and the a optical signal is calculated.

As shown in FIG. 3, FIG. 3 is a schematic structural diagram in which the frequency difference between the reference optical signal and the first optical signal is calculated.

It should be noted herein that a difference between manner 1 and manner 2 lies in that frequency conversion is performed on different objects, that is, frequency conversion may be performed on the single-frequency signal, so that the frequency of the single-frequency signal obtained after the frequency conversion is the same as the frequency of the reference clock, or frequency conversion may be performed on the reference clock, so that the frequency of the reference clock obtained after the frequency conversion is the same as the frequency of the single-frequency signal.

Method 2:

Step 1: Modulate the reference optical signal and the first optical signal to be intra-frequency signals by using a modulator.

Manner 1: Modulate the reference optical signal by using a specified reference clock, so that the modulated reference optical signal and the first optical signal have a same frequency.

Specifically, frequency multiplication processing is performed on the specified reference clock, and the reference optical signal is modulated by using a reference clock obtained after the frequency multiplication processing, so that the modulated reference optical signal and the first optical signal have a same frequency.

Figure 4:
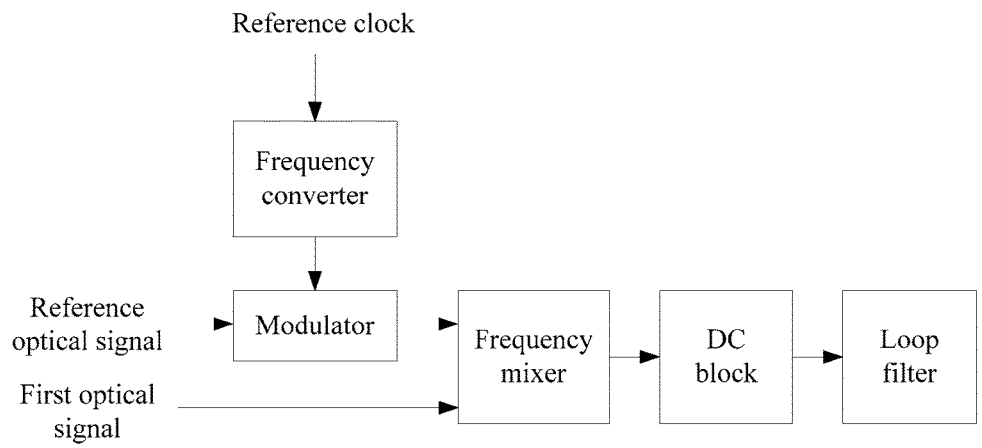
FIG. 4 is a schematic structural diagram in which a frequency difference between a reference optical signal and a first optical signal is calculated.

As shown in FIG. 4, FIG. 4 is a schematic structural diagram in which the frequency difference between the reference optical signal and the first optical signal is calculated.

Manner 2: Modulate the first optical signal by using a specified reference clock, so that the modulated first optical signal and the reference optical signal have a same frequency.

Specifically, frequency multiplication processing is performed on the specified reference clock, and the first optical signal is modulated by using a reference clock obtained after the frequency multiplication processing, so that the modulated first optical signal and the reference optical signal have a same frequency.

Figure 5:
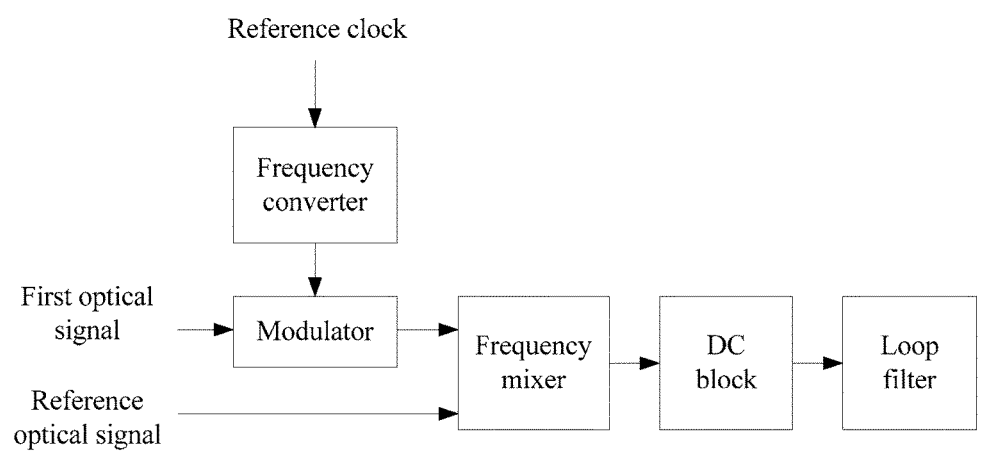
FIG. 5 is a schematic structural diagram in which a frequency difference between a reference optical signal and a first optical signal is calculated.

As shown in FIG. 5, FIG. 5 is a schematic structural diagram in which the frequency difference between the reference optical signal and the first optical signal is calculated.

Step 2: Perform frequency mixing and direct-current filtering processing on the reference optical signal and the first optical signal that are intra-frequency signals, to obtain the frequency difference between the reference optical signal and the first optical signal.

Specifically, in FIG. 4, frequency mixing is performed on the modulated reference optical signal and the first optical signal; and direct-current filtering processing is performed, by using a DC block, on a single-frequency signal obtained after the frequency mixing; then, low-pass loop filtering is performed on a single-frequency signal obtained after filtering, and the frequency difference between the reference optical signal and the first optical signal is obtained.

Specifically, in FIG. 5, frequency mixing is performed on the modulated first optical signal and the reference optical signal; and direct-current filtering processing is performed, by using a DC block, on a single-frequency signal obtained after the frequency mixing; then, low-pass loop filtering is performed on a single-frequency signal obtained after filtering, and the frequency difference between the reference optical signal and the first optical signal is obtained.

Step 103: Calculate a difference between a specified frequency difference and the frequency difference between the reference optical signal and the first optical signal.

The specified frequency difference may be determined according to an actual requirement, or may be determined according to experimental data. This is not specifically limited herein.

Step 104: Perform frequency calibration on the first optical signal according to the difference, modulate to-be-sent uplink data by using the calibrated first optical signal, and send the modulated uplink data to a primary node.

In step 104, frequency calibration is performed on the first optical signal according to the difference, so that an optical signal generated by a laser source of the transmitter is kept within an excepted frequency range.

It should be noted herein that modulation performed on the to-be-sent uplink data by using the calibrated first optical signal may be intensity modulation, or may be IQ (in-phase quadrature) modulation.

In the solution in this embodiment of the present invention, a first optical signal that experiences a frequency offset and that is generated by a laser in a transmitter of an access node is received; a reference optical signal sent by a local oscillator is received, where the reference optical signal is obtained after a receiver of the access node performs, by using a received second optical signal sent by a primary node, frequency calibration on a third optical signal generated by the local oscillator; a difference between a specified frequency difference and a frequency difference between the reference optical signal and the first optical signal is calculated; and frequency calibration is performed on the first optical signal according to the difference, to-be-sent uplink data is modulated by using the calibrated first optical signal, and the modulated uplink data is sent to the primary node. In this way, in a UDWDM convergence network, each access node uses an optical signal sent by a primary node as a reference, to perform frequency offset calibration on an optical signal that experiences a frequency offset and that is generated by a laser in a transmitter, so that uplink signals transmitted by all access nodes corresponding to the primary node have a same relative offset. Therefore, crosstalk between adjacent channels caused in a transmission process of the uplink signals is effectively avoided, and transmission performance of the uplink signals is improved.

Figure 6:
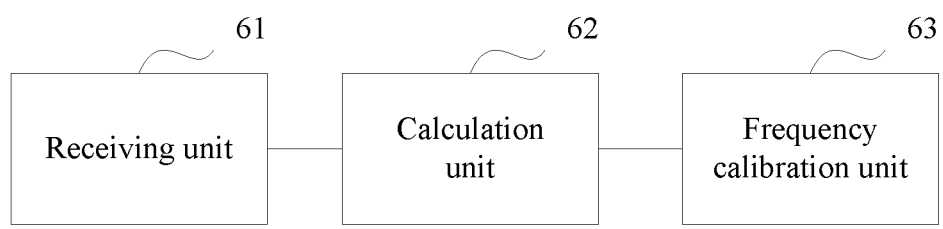
FIG. 6 is a schematic structural diagram of an optical signal frequency calibration device according to the present invention.

FIG. 6 is a schematic structural diagram of an optical signal frequency calibration device according to an embodiment of the present invention. The frequency calibration device includes a receiving unit 61, a calculation unit 62, and a frequency calibration unit 63.

The receiving unit 61 is configured to: receive a first optical signal that experiences a frequency offset and that is generated by a laser in a transmitter of an access node, and receive a reference optical signal sent by a local oscillator, where the reference optical signal is obtained after a receiver of the access node performs, by using a received second optical signal sent by a primary node, frequency calibration on a third optical signal generated by the local oscillator.

The calculation unit 62 is configured to calculate a difference between a specified frequency difference and a frequency difference between the reference optical signal and the first optical signal.

The frequency calibration unit 63 is configured to: perform frequency calibration on the first optical signal according to the difference, modulate to-be-sent uplink data by using the calibrated first optical signal, and send the modulated uplink data to the primary node.

Optionally, the calculation unit 62 is specifically configured to perform coupling and direct-current filtering processing on the reference optical signal and the first optical signal, to obtain a single-frequency signal; and determine the frequency difference between the reference optical signal and the first optical signal by using the single-frequency signal and a specified reference clock.

Optionally, that the calculation unit 62 determines the frequency difference between the reference optical signal and the first optical signal by using the single-frequency signal and the specified reference clock specifically includes:

determining a frequency of the specified reference clock;
performing frequency conversion processing on the single-frequency signal according to the frequency of the reference clock, so that a frequency of the single-frequency signal obtained after the frequency conversion processing is the same as the frequency of the reference clock; and calculating a phase difference between the single-frequency signal obtained after the frequency conversion processing and a signal of the clock, and obtaining the frequency difference between the reference optical signal and the first optical signal according to the phase difference.

Optionally, that the calculation unit 62 determines the frequency difference between the reference optical signal and the first optical signal by using the single-frequency signal and the specified reference clock specifically includes:

determining a frequency of the single-frequency signal;
performing frequency conversion processing on the reference clock according to the frequency of the single-frequency signal, so that a frequency of the reference clock obtained after the frequency conversion processing is the same as the frequency of the single-frequency signal; and calculating a phase difference between the frequency of the reference clock obtained after the frequency conversion processing and the single-frequency signal, and obtaining the frequency difference between the reference optical signal and the first optical signal according to the phase difference.

Optionally, the calculation unit 62 is specifically configured to modulate the reference optical signal and the first optical signal to be intra-frequency signals by using a modulator; and perform frequency mixing and direct-current filtering processing on the reference optical signal and the first optical signal that are intra-frequency signals, to obtain the frequency difference between the reference optical signal and the first optical signal.

Optionally, that the calculation unit 62 modulates the reference optical signal and the first optical signal to be intra-frequency signals by using the modulator specifically includes:

modulating the reference optical signal by using a specified reference clock, so that the modulated reference optical signal and the first optical signal have a same frequency.

Optionally, that the calculation unit 62 modulates the reference optical signal and the first optical signal to be intra-frequency signals by using the modulator specifically includes:

modulating the first optical signal by using a specified reference clock, so that the modulated first optical signal and the reference optical signal have a same frequency.

Optionally, that the reference optical signal is obtained after a receiver of the access node performs, by using a received second optical signal sent by a primary node, frequency calibration on a third optical signal generated by the local oscillator includes:

the reference optical signal is obtained by the receiver of the access node in the following manner:

calculating a frequency difference between the received second optical signal sent by the primary node and the third optical signal generated by the local oscillator; and performing calibration on the third signal by using the frequency difference, where an obtained calibrated optical signal is the reference optical signal.

It should be noted that the frequency calibration device provided in this embodiment of the present invention may be implemented in a hardware manner or in a software manner. This is not limited herein.

Figure 7:
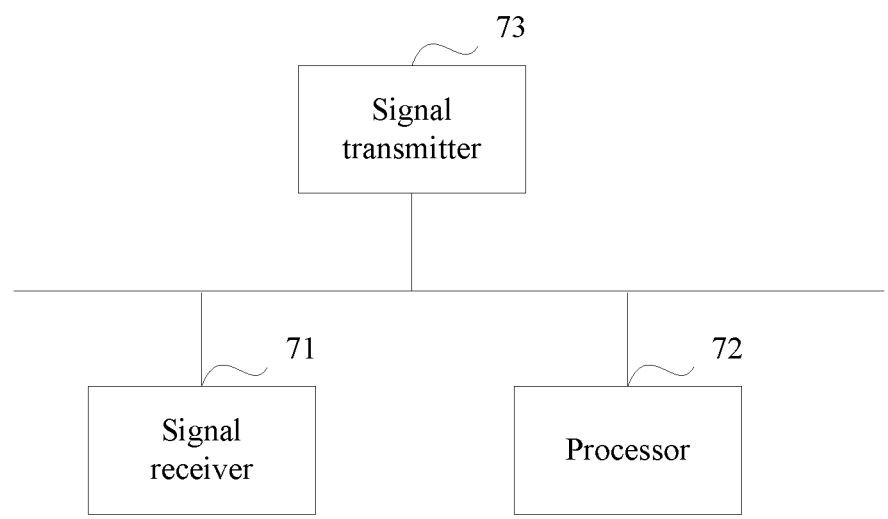
FIG. 7 is a schematic structural diagram of an optical signal frequency calibration device according to the present invention.

As shown in FIG. 7, FIG. 7 is a schematic structural diagram of an optical signal frequency calibration device according to an embodiment of the present invention. The frequency calibration device is capable of performing the foregoing function, and the frequency calibration device may use a general-purpose computer system structure. Specifically, the computer system may be a processor-based computer. The frequency calibration device entity includes a signal receiver 71, a processor 72, and a signal transmitter 73.

The processor 72 may be a general-purpose central processing unit (CPU), a microprocessor, an application-specific integrated circuit (application-specific integrated circuit, ASIC), or one or more integrated circuits configured to control program execution of the solution in the present invention.

The signal receiver 71 is configured to: receive a first optical signal that experiences a frequency offset and that is generated by a laser in a transmitter of an access node, and receive a reference optical signal sent by a local oscillator, where the reference optical signal is obtained after a receiver of the access node performs, by using a received second optical signal sent by a primary node, frequency calibration on a third optical signal generated by the local oscillator.

The processor 72 is configured to: calculate a difference between a specified frequency difference and a frequency difference between the reference optical signal and the first optical signal, perform frequency calibration on the first optical signal according to the difference, and modulate to-be-sent uplink data by using the calibrated first optical signal.

The signal transmitter 73 is configured to send the modulated uplink data to the primary node.

Optionally, that the processor 72 calculates the frequency difference between the reference optical signal and the first optical signal includes:

performing coupling and direct-current filtering processing on the reference optical signal and the first optical signal, to obtain a single-frequency signal; and determining the frequency difference between the reference optical signal and the first optical signal by using the single-frequency signal and a specified reference clock.

Optionally, that the processor 72 determines the frequency difference between the reference optical signal and the first optical signal by using the single-frequency signal and the specified reference clock includes:

determining a frequency of the specified reference clock;

performing frequency conversion processing on the single-frequency signal according to the frequency of the reference clock, so that a frequency of the single-frequency signal obtained after the frequency conversion processing is the same as the frequency of the reference clock; and calculating a phase difference between the single-frequency signal obtained after the frequency conversion processing and a signal of the clock, and obtaining the frequency difference between the reference optical signal and the first optical signal according to the phase difference.

Optionally, that the processor 72 determines the frequency difference between the reference optical signal and the first optical signal by using the single-frequency signal and the specified reference clock includes:

determining a frequency of the single-frequency signal;

performing frequency conversion processing on the reference clock according to the frequency of the single-frequency signal, so that a frequency of the reference clock obtained after the frequency conversion processing is the same as the frequency of the single-frequency signal; and calculating a phase difference between the frequency of the reference clock obtained after the frequency conversion processing and the single-frequency signal, and obtaining the frequency difference between the reference optical signal and the first optical signal according to the phase difference.

Optionally, that the processor 72 calculates the frequency difference between the reference optical signal and the first optical signal includes:

modulating the reference optical signal and the first optical signal to be intra-frequency signals by using a modulator; and performing frequency mixing and direct-current filtering processing on the reference optical signal and the first optical signal that are intra-frequency signals, to obtain the frequency difference between the reference optical signal and the first optical signal.

Optionally, that the processor 72 modulates the reference optical signal and the first optical signal to be intra-frequency signals by using the modulator includes:

modulating the reference optical signal by using a specified reference clock, so that the modulated reference optical signal and the first optical signal have a same frequency.

Optionally, that the processor 72 modulates the reference optical signal and the first optical signal to be intra-frequency signals by using the modulator includes:

modulating the first optical signal by using a specified reference clock, so that the modulated first optical signal and the reference optical signal have a same frequency.

Optionally, that the reference optical signal is obtained after a receiver of the access node performs, by using a received second optical signal sent by a primary node, frequency calibration on a third optical signal generated by the local oscillator includes:

the reference optical signal is obtained by the receiver of the access node in the following manner:

calculating a frequency difference between the received second optical signal sent by the primary node and the third optical signal generated by the local oscillator; and performing calibration on the third signal by using the frequency difference, where an obtained calibrated optical signal is the reference optical signal.

In this embodiment, when an application program is executed by the processor, for processing of a deployment device and a method for interacting with another network element, refer to the foregoing method embodiments. Details are not described herein.

According to the frequency calibration device provided in this embodiment, crosstalk between adjacent channels caused in a transmission process of uplink signals can be effectively avoided, and transmission performance of the uplink signals is improved.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the sprit and scope of the present invention. The present invention is intended to cover these modifications and variations provided that they fall within the scope of protection defined by the following claims and their equivalent technologies.

What is claimed is:

1. An optical signal frequency calibration method, comprising:
   receiving a first optical signal that experiences a frequency offset and that is generated by a laser in a transmitter of an access node;
   receiving a reference optical signal sent by a local oscillator, wherein the reference optical signal is obtained after a receiver of the access node performs, by using a received second optical signal sent by a primary node, frequency calibration on a third optical signal generated by the local oscillator;
   calculating a difference between a specified frequency difference and a frequency difference between the reference optical signal and the first optical signal; and
   performing frequency calibration on the first optical signal according to the difference, modulating to-be-sent uplink data by using the calibrated first optical signal, and sending the modulated uplink data to the primary node.

2. The frequency calibration method according to claim 1, wherein the calculating a frequency difference between the reference optical signal and the first optical signal comprises:
   performing coupling and direct-current filtering processing on the reference optical signal and the first optical signal, to obtain a single-frequency signal; and
   determining the frequency difference between the reference optical signal and the first optical signal by using the single-frequency signal and a specified reference clock.

3. The frequency calibration method according to claim 2, wherein the determining the frequency difference between the reference optical signal and the first optical signal by using the single-frequency signal and a specified reference clock comprises:
   determining a frequency of the specified reference clock;
   performing frequency conversion processing on the single-frequency signal according to the frequency of the reference clock, so that a frequency of the single-frequency signal obtained after the frequency conversion processing is the same as the frequency of the reference clock; and
   calculating a phase difference between the single-frequency signal obtained after the frequency conversion processing and a signal of the clock, and obtaining the frequency difference between the reference optical signal and the first optical signal according to the phase difference.

4. The frequency calibration method according to claim 2, wherein the determining the frequency difference between the reference optical signal and the first optical signal by using the single-frequency signal and a specified reference clock comprises:
   determining a frequency of the single-frequency signal;
   performing frequency conversion processing on the reference clock according to the frequency of the single-frequency signal, so that a frequency of the reference clock obtained after the frequency conversion processing is the same as the frequency of the single-frequency signal; and
   calculating a phase difference between the frequency of the reference clock obtained after the frequency conversion processing and the single-frequency signal, and obtaining the frequency difference between the reference optical signal and the first optical signal according to the phase difference.

5. The frequency calibration method according to claim 1, wherein the calculating a frequency difference between the reference optical signal and the first optical signal comprises:
   modulating the reference optical signal and the first optical signal to be intra-frequency signals by using a modulator; and
   performing frequency mixing and direct-current filtering processing on the reference optical signal and the first optical signal that are intra-frequency signals, to obtain the frequency difference between the reference optical signal and the first optical signal.

6. The frequency calibration method according to claim 5, wherein the modulating the reference optical signal and the first optical signal to be intra-frequency signals by using a modulator comprises:
   modulating the reference optical signal by using a specified reference clock, so that the modulated reference optical signal and the first optical signal have a same frequency.

7. The frequency calibration method according to claim 5, wherein the modulating the reference optical signal and the first optical signal to be intra-frequency signals by using a modulator comprises:

modulating the first optical signal by using a specified reference clock, so that the modulated first optical signal and the reference optical signal have a same frequency.

8. The frequency calibration method according to claim 1, wherein that the reference optical signal is obtained after a receiver of the access node performs, by using a received second optical signal sent by a primary node, frequency calibration on a third optical signal generated by the local oscillator comprises:

the reference optical signal is obtained by the receiver of the access node in the following manner:
calculating a frequency difference between the received second optical signal sent by the primary node and the third optical signal generated by the local oscillator; and
performing calibration on the third optical signal by using the frequency difference, wherein an obtained calibrated optical signal is the reference optical signal.

9. An optical signal frequency calibration device, comprising:

a receiving unit, configured to: receive a first optical signal that experiences a frequency offset and that is generated by a laser in a transmitter of an access node, and receive a reference optical signal sent by a local oscillator, wherein the reference optical signal is obtained after a receiver of the access node performs, by using a received second optical signal sent by a primary node, frequency calibration on a third optical signal generated by the local oscillator;

a calculation unit, configured to calculate a difference between a specified frequency difference and a frequency difference between the reference optical signal and the first optical signal; and a frequency calibration unit, configured to: perform frequency calibration on the first optical signal according to the difference, modulate to-be-sent uplink data by using the calibrated first optical signal, and send the modulated uplink data to the primary node.

10. The frequency calibration device according to claim 9, wherein:

the calculation unit is specifically configured to perform coupling and direct-current filtering processing on the reference optical signal and the first optical signal, to obtain a single-frequency signal; and
determine the frequency difference between the reference optical signal and the first optical signal by using the single-frequency signal and a specified reference clock.

11. The frequency calibration device according to claim 10, wherein that the calculation unit determines the frequency difference between the reference optical signal and the first optical signal by using the single-frequency signal and the specified reference clock specifically comprises:

determining a frequency of the specified reference clock;
performing frequency conversion processing on the single-frequency signal according to the frequency of the reference clock, so that a frequency of the single-frequency signal obtained after the frequency conversion processing is the same as the frequency of the reference clock; and
calculating a phase difference between the single-frequency signal obtained after the frequency conversion processing and a signal of the clock, and obtaining the frequency difference between the reference optical signal and the first optical signal according to the phase difference.

12. The frequency calibration device according to claim 10, wherein that the calculation unit determines the frequency difference between the reference optical signal and the first optical signal by using the single-frequency signal and the specified reference clock specifically comprises:

determining a frequency of the single-frequency signal;
performing frequency conversion processing on the reference clock according to the frequency of the single-frequency signal, so that a frequency of the reference clock obtained after the frequency conversion processing is the same as the frequency of the single-frequency signal; and
calculating a phase difference between the frequency of the reference clock obtained after the frequency conversion processing and the single-frequency signal, and obtaining the frequency difference between the reference optical signal and the first optical signal according to the phase difference.

13. An optical signal frequency calibration device, comprising:

a signal receiver, configured to: receive a first optical signal that experiences a frequency offset and that is generated by a laser in a transmitter of an access node, and receive a reference optical signal sent by a local oscillator, wherein the reference optical signal is obtained after a receiver of the access node performs, by using a received second optical signal sent by a primary node, frequency calibration on a third optical signal generated by the local oscillator;

a processor, configured to: calculate a difference between a specified frequency difference and a frequency difference between the reference optical signal and the first optical signal, perform frequency calibration on the first optical signal according to the difference, and modulate to-be-sent uplink data by using the calibrated first optical signal; and a signal transmitter, configured to send the modulated uplink data to the primary node.

14. The frequency calibration device according to claim 13, wherein that the processor calculates the frequency difference between the reference optical signal and the first optical signal comprises:

performing coupling and direct-current filtering processing on the reference optical signal and the first optical signal, to obtain a single-frequency signal; and
determining the frequency difference between the reference optical signal and the first optical signal by using the single-frequency signal and a specified reference clock.

15. The frequency calibration device according to claim 14, wherein that the processor determines the frequency difference between the reference optical signal and the first optical signal by using the single-frequency signal and the specified reference clock comprises:

determining a frequency of the specified reference clock;
performing frequency conversion processing on the single-frequency signal according to the frequency of the reference clock, so that a frequency of the single-frequency signal obtained after the frequency conversion processing is the same as the frequency of the reference clock; and
calculating a phase difference between the single-frequency signal obtained after the frequency conversion processing and a signal of the clock, and obtaining the frequency difference between the reference optical signal and the first optical signal according to the phase difference.

16. The frequency calibration device according to claim 14, wherein that the processor determines the frequency difference between the reference optical signal and the first optical signal by using the single-frequency signal and the specified reference clock comprises:
   determining a frequency of the single-frequency signal;
   performing frequency conversion processing on the reference clock according to the frequency of the single-frequency signal, so that a frequency of the reference clock obtained after the frequency conversion processing is the same as the frequency of the single-frequency signal; and
   calculating a phase difference between the frequency of the reference clock obtained after the frequency conversion processing and the single-frequency signal, and obtaining the frequency difference between the reference optical signal and the first optical signal according to the phase difference.

17. The frequency calibration device according to claim 13, wherein that the processor calculates the frequency difference between the reference optical signal and the first optical signal comprises:
   modulating the reference optical signal and the first optical signal to be intra-frequency signals by using a modulator; and
   performing frequency mixing and direct-current filtering processing on the reference optical signal and the first optical signal that are intra-frequency signals, to obtain the frequency difference between the reference optical signal and the first optical signal.

18. The frequency calibration device according to claim 17, wherein that the processor modulates the reference optical signal and the first optical signal to be intra-frequency signals by using the modulator comprises:
   modulating the reference optical signal by using a specified reference clock, so that the modulated reference optical signal and the first optical signal have a same frequency.

19. The frequency calibration device according to claim 17, wherein that the processor modulates the reference optical signal and the first optical signal to be intra-frequency signals by using the modulator comprises:
   modulating the first optical signal by using a specified reference clock, so that the modulated first optical signal and the reference optical signal have a same frequency.

20. The frequency calibration device according to claim 13, wherein that the reference optical signal is obtained after a receiver of the access node performs, by using a received second optical signal sent by a primary node, frequency calibration on a third optical signal generated by the local oscillator comprises:
   the reference optical signal is obtained by the receiver of the access node in the following manner:
   calculating a frequency difference between the received second optical signal sent by the primary node and the third optical signal generated by the local oscillator; and
   performing calibration on the third signal by using the frequency difference, wherein an obtained calibrated optical signal is the reference optical signal.

* * * * *